Dec. 1, 1959     H. D. PRUTTON     2,914,781
SCREW AND WASHER ASSEMBLING APPARATUS
Filed Sept. 30, 1955     3 Sheets-Sheet 1

INVENTOR.
Howard D. Prutton
BY
Hyde, Meyer, Baldwin & Doran
Attorneys

Dec. 1, 1959   H. D. PRUTTON   2,914,781
SCREW AND WASHER ASSEMBLING APPARATUS
Filed Sept. 30, 1955   3 Sheets-Sheet 2

INVENTOR.
*Howard D. Prutton*
BY
*Hyde, Meyer, Baldwin & Doran*
*Attorneys*

Dec. 1, 1959　　　　　H. D. PRUTTON　　　　2,914,781
SCREW AND WASHER ASSEMBLING APPARATUS
Filed Sept. 30, 1955　　　　　　　　　　3 Sheets-Sheet 3

INVENTOR.
Howard D. Prutton
BY
Hyde, Meyer, Baldwin & Doran
Attorneys

United States Patent Office 2,914,781
Patented Dec. 1, 1959

2,914,781

SCREW AND WASHER ASSEMBLING APPARATUS

Howard D. Prutton, Parma, Ohio

Application September 30, 1955, Serial No. 537,718

29 Claims. (Cl. 10—155)

This invention relates to improvements in grouping or assembling apparatus and more particularly to screw element and washer element assembling apparatus.

One of the objects of the present invention is to provide apparatus for assembling or grouping elements at high speed, and especially for assembling bolt and screw elements, by relative movement along an assembly axis corresponding to the longitudinal axis of the screw element, prior to rolling of the threads on the screw element and thereby retaining the washer element in assembled relationship.

A further object of the present invention is to provide an apparatus for assembling elements comprising an initial assembly unit for moving the elements to an initial telescopically associated location along the assembly axis and a final assembly unit for completing movement along the assembly axis.

A further object of the present invention is to provide an apparatus for assembling or grouping elements by moving both generally normal to an axis, such as an assembly axis, while moving them axially relative to each other.

A further object of the present invention is to provide an apparatus for assembling or grouping elements by continuous and smooth movement of the elements between loading and discharge positions thereof.

A further object of the present invention is to provide apparatus for grouping or assembling different elements from different supplies and for releasing or discharging the element group gathered or assembled in response to simultaneous presence of at least one element from each supply.

A further object of the present invention is to provide an assembling or grouping apparatus having a pair of synchronously rotatable wheels and/or a pair of co-acting slides of different inclination with respect to the horizontal.

A further object of the present invention is to provide an element assembling or grouping apparatus characterized by its structural simplicity, its high speed of operation, its ease of operation, its operating efficiency, and its relative inexpensive manufacturing cost.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 5 is a longitudinal view taken along the line 5—5 of Fig. 3 through the slot of the slide in the final assembly unit; while

Before the apparatus here illustrated is specifically described, it is to be understood that the invention here involved is not limited to the structural details or arrangement of parts here shown since element grouping or assembling apparatuses embodying the present invention may take various forms. It also is to be understood that the phraseology or terminology herein employed is for purposes of description and not of limitation since the scope of the present invention is denoted by the appended claims.

While this invention might be adapted to various uses, I have chosen to show the same as an apparatus for assembling washer elements 30 and screw blank elements 31 by relative movement along an assembly axis of each corresponding to the longitudinal axis of the screw blank element extending through the screw shank 31 and head 31b. After assembly, threads may be rolled upon the screw blank element to lock the washer element in assembled position. However, it should be readily apparent that the screw element may take the form of either a screw blank or threaded screw blank prior to assembly and the machine will work equally well. The machine may also be used for grouping and transferring any other kind of elements or for assembling any other kind of complementary elements.

Figure 1:
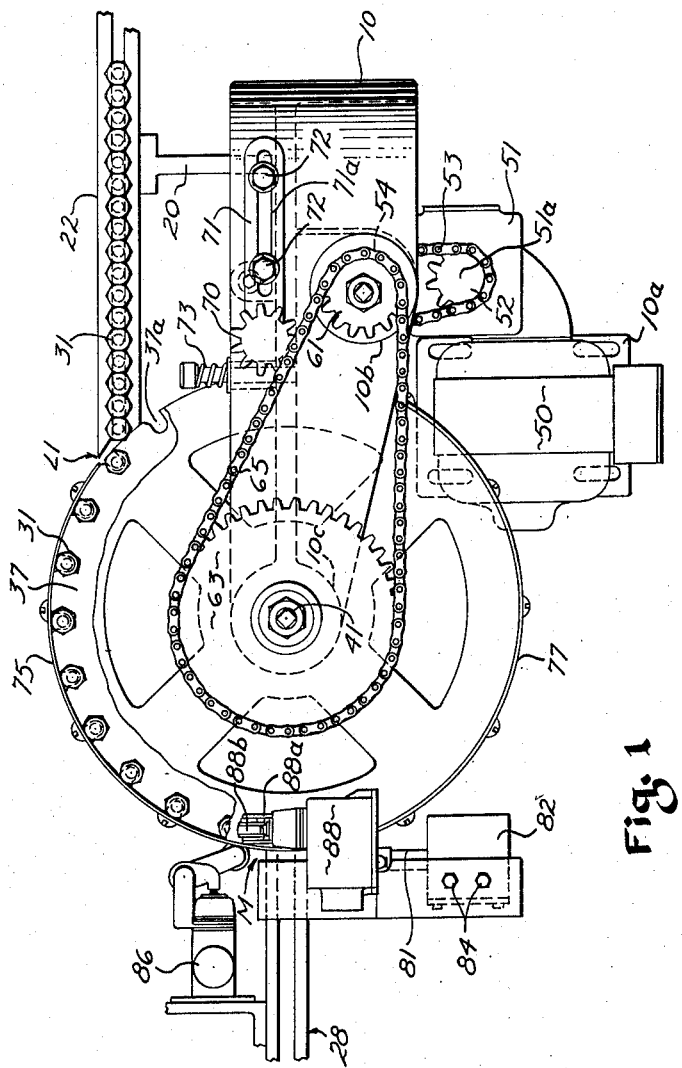
Fig. 1 is a top plan view of the machine or apparatus far assembling or gathering elements with a portion thereof cut away.

The machine frame includes a plurality of parts rigidly connected together. Base member 10 in Fig. 1 is disclosed in the drawings as including a motor base 10a projecting out from one side thereof, a C-shaped projection from one side thereof including upper and lower arms 10m and 10n having integrally formed therewith bearing housings 10b, 10c and 10d, 10e respectively. Upper member 12 and lower member 14 are secured by screws 15 to bearing housings 10c and 10d respectively, with each of these members having coaxially aligned a circular periphery and a central bore.

Figure 3:
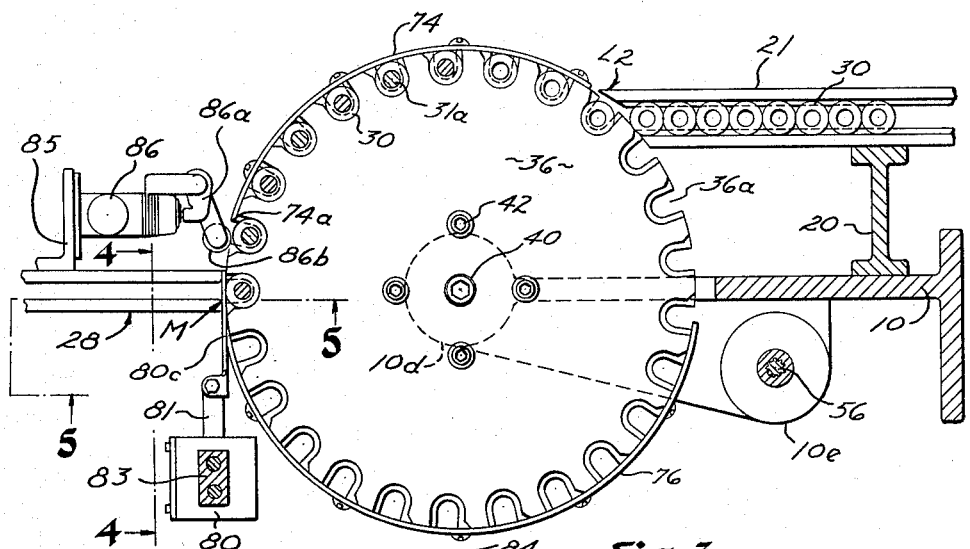
Fig. 3 is a top view of the washer element conveyor wheel taken along the line 3—3 of Fig. 2.

The frame also includes means to attach the feed-in chutes 21, 22 and discharge chute 28 in Figs. 1 and 3 and a discharge gate with controls therefor to base member 10 or any other suitable support. These attaching means may take any suitable form, and need not be restricted to the disclosed construction. Here, bracket 20 in Figs. 1 and 3 secures the feed-in chutes 21 and 22 to the web of base member 10. At the discharge end of the machine, generally flat, plate-like member 23 in Fig. 4 serves as a vertical post for supporting the discharge chute, discharge gate, and controls therefor. This member 23 is secured to the periphery of the lower member 14 in Fig. 2 by a bracket 23a in Fig. 4 by any suitable means, such as detachable screws. A right angle bracket 25 is secured to the upper end of the member 23 and supports at its right end in Fig. 4 a gate actuating member. Discharge chute 28 is secured to boss or raised surface 23b on the left side of member 23 in Fig. 4 and to a right angle support bracket 26. Another right angle support and spacer bracket 27 is secured at its left end to bracket 26 for supporting the discharge chute and maintaining the lateral spacing of the upper slide slot therein.

Feed-in chutes 21, 22 each include rails spaced apart in any suitable conventional manner for receiving in aligned relationship washer elements 30 and screw elements 31 respectively to be fed one at a time into the lower and upper levels of the assemblying machine.

During assembly, the elements are carried by any suitable element conveying means with element carrier means thereon adapted to travel along any preselected path. Here, each conveying means takes the form of a wheel 34 or 35 in Fig. 2 with a plurality of screw element carrier recesses spaced equal distances apart about its periphery. Wheel 34 or 35 includes respectively disc 36 or 37 secured to a hub 38 or 39 by screws 42 with the hub having a radially split wall clamped to a shaft 40 or 41 by a screw 43. The wheel 34 or 35 is mounted for rotation about its axis with shaft 40 or 41 rotatable in bearing housings 10d or 10c in suitable bearings (only bearing 45 being shown) respectively so as to carry the plurality of element carrier recesses or element carrier means 36a or 37a, in Figs. 3 or 1 equally spaced apart about its periphery and located at a uniform distance from the axis of rotation with each having an outwardly opening mouth, between loading stations L1 or L2 and common discharge stations D for both wheels.

Means is provided for assemblying the elements while on the carrier wheels 34, 35 during travel between loading and discharge stations L1, L2, and M. The assembling action is caused by having the element carrier recesses approach each other as they advance synchronously and in alignment with each other along the paths between loading and discharge positions. These recesses are adapted to support the elements individually so that the shank 31a of each screw element 31 is directed downwardly toward and generally in alignment with the hole in its associated washer element 30.

The approach movement is caused by having the axes of rotation of the wheels 34 and 35 in non-coaxial relationship, here shown as intersecting with respect to each other. Therefore, the distance between the recesses 36a and 37a is made farther apart at the loading stations L1 and L2 than at the discharge stations M so that the elements at the loading stations L1 and L2 are spaced axially apart out of telescopic assembly but are assembled while traveling to the discharge stations M.

These wheels 34 and 35 are synchronously and continuously driven in the same direction with the recesses 36a and 37a in alignment. Here, motor 50, mounted in Figs. 1 and 2 on motor base 10a on the base member 10, drives these wheels through gear box 51, gear box output shaft 51a, drive sprocket 52, link drive chain 53, driven sprocket 54, lower shaft 56, universal joint 58 (preferably of the constant velocity type), and upper shaft 57 with shafts 56 and 57 rotatably mounted respectively in bearing housings 10e and 10b. Drive sprockets 61 and 62 are secured respectively to upper shaft 57 and lower shaft 56 to drive respectively by link drive chains 65 and 66 the sprockets 63 and 64 secured to shafts 41 and 40 for driving wheels 35 and 34.

If desired, an idler gear may be provided for each of the chains 65 and 66 in the manner shown in Fig. 1 for chain 65. Here, any suitable adjustable and biasing construction can be used with the one illustrated being an idler gear carrier 71 having an elongated slot 71a adjustably secured to the base member 10 by a plurality of screws 72 and carrying a bearing for gear 70 biased by spring 73 against the chain 65.

When the recesses 36a and 37a travel between the loading and discharge stations, initial assembly of the screw and washer elements takes place. These recesses travel generally normal to the assembly axes of the screw elements along the full length of the paths from prior to until after initial assembly thereof so that substantially all relative movement, and especially relative rectilinear movement, between these elements is confined to relative gradual, constant velocity, axial approach movement between them throughout their travel between these stations.

Retaining means is provided for covering the open mouths of the recesses 36a and 37a to prevent accidental discharge of the elements therefrom between the stations. Here, arcuate lower retaining walls 74 and 76 and upper retaining walls 75 and 77 are secured respectively to members 14 and 12 by screws 78. All of these retaining walls are similar in shape and serve a similar function; only the arcuate extent and location varies. Walls 74 and 75 are of approximately the same arcuate extent and aligned approximately above and below each other while walls 76 and 77 correspond in the same manner. These walls are rigidly located around the periphery of their associated wheels and cover the open mouths of recesses 36a and 37a against element escape caused by the axes of the wheels 34 and 35 in Fig. 2 being tilted with respect to the horizontal with both located on the same side of the vertical. The loading stations L1 and L2 and common discharge stations M are located respectively above and below the horizontal diameters of the associated wheels 34 and 35 to provide gravity loading thereof of the elements one at a time from the chutes 21 and 22 and discharge therefrom onto the discharge chute 28 through the open mouths of the recesses 36a and 37a. The mouths of the recesses open outwardly in the same direction and are inclined downwardly at the discharge stations M. The retaining walls 74 and 75 cover the open mouths in the path of travel between the loading and discharge stations to prevent premature discharge of the elements therefrom while the retaining walls 76 and 77 cover the open mouths from the discharge stations to above the horizontal on the return path for a reason to be brought out more in detail hereinafter.

Means is provided at the discharge stations M for discharging only pairs of elements, either properly assembled or grouped with one discharge simultaneously from each wheel. In the present disclosure, this takes the form of a gate for controlling gravity dischargeable recesses or any other suitable element discharge means responsive to the simultaneous presence at the discharge stations M of both elements 30 and 31 in properly assembled relationship. Here, a gate 80 has integrally connected together a gate actuating portion 80a in Fig. 4, an upper gate portion 80b for covering the open mouths of recesses 37a in a gap between the retaining walls 75 and 77, and a lower gate portion 80c for covering the open mouths of the recesses 36a opening outwardly through a gap between the retaining walls 74 and 76. Gate 80 is movable horizontally in Fig. 4 between recess mouth covering and uncovering positions by a solenoid armature 81, pivotally connected to the right end of gate portion 80a and telescopically movable within solenoid 82 mounted on the right end of bracket 25 by screws 84 extending through holes in a spacer block 83.

Figure 6:
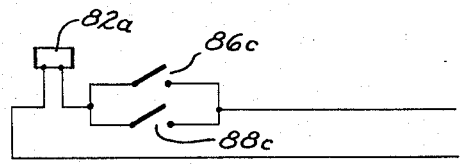
Fig. 6 is a diagram of an electrical circuit for actuating the discharge gate.

The coil 82a in Fig. 6 of solenoid 82 is energized or deenergized to move the gate in response to the presence or absence of one or both elements at the discharge stations. Here, switch 86 in Fig. 3 is secured to an upwardly extending bracket 85 fixed to one wall of the discharge chute 28, while switch 88 in Fig. 1 is secured to the top of bracket 25. The switch 86 or 88 has respectively contact actuating, spring biased bell crank 86a or 88a having rotatable follower wheel 86b or 88b on the distal end of one arm thereof for opening and closing contacts 86c or 88c, arranged in parallel in the energizing circuit of solenoid coil 82a in Fig. 6, by movement of the distal end of the other arm. Wheels 86b and 88b keep their respective switches open to deenergize coil 82a and keep gate 80 open as long as the wheels respectively engage the periphery of either washer element 30 or wheel disc 36 through a cutout 74a (Fig. 3) in retaining wall 74 and engage the top of screw heads 31b; then, gate 80 will assume the open position in Fig. 4 under the bias of a suitable spring of conventional type urging the solenoid armature 81 toward the right. When either follower wheel is biased by its spring within its associated element recess 36a or 37a, its switch contact will close so as to energize solenoid coil 82a and close gate 80. Opening the closed contact or contacts again will move the gate 80 toward the right to its normally open position so that the perfectly assembled elements can continuously and smoothly flow from the discharge stations M. Hence, the gate portions 80b, 80c are in the uncovering position with both elements present and properly assembled at discharge stations M but in the covering position if less than both (one or none) are present; only properly assembled element pairs are discharged.

Although this disclosed construction is the preferred form with the normally open gate with deenergized solenoid, it should be readily understood that the construction could be easily converted to another form, such as a normally closed type gate with deenergized solenoid which opens each time properly assembled elements come to the discharge stations M. This would require switches 86c and 88c to be arranged in series and kept closed unless its roller is biased into its associated recess. Also, suitable time delay means may be provided in the Fig. 6 circuit but the disclosed construction relies on the relationship between the rotational speed and the time required for solenoid operation.

Any element retained within its recess and not ejected or discharged at stations M will be retained within its recess by gate 80 and retaining wall 76 or 77 so that it will be returned past its loading station and back to its discharge station on the next cycle of the machine. Also, the retained element will prevent the gravity down-feed of another element into its recess from the supply in its associated chute 21 or 22.

Figure 5:
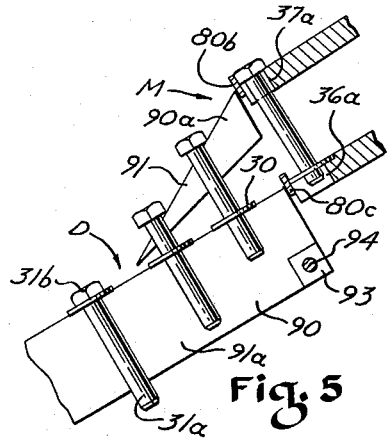
Figure 2:
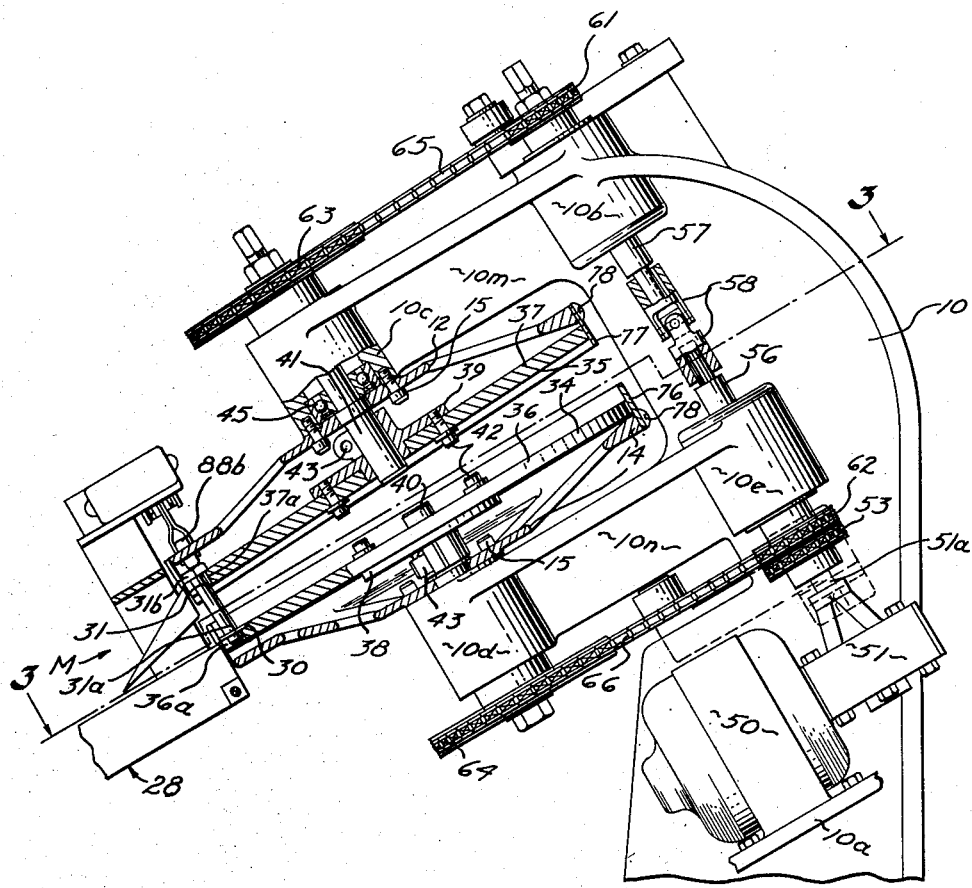
Fig. 2 is a side elevational view with portions thereof in vertical section.

Between loading stations L1, L2 and the discharge stations M, initial assembly has been performed by this initial assembly unit of the machine by moving the elements to an initial telescopically associated location along the assembly axis of the screw element corresponding to the posititon shown on the left in Fig. 2 and on the right in Fig. 5. Now, the final assembly of the elements is performed by completing the movement along the assembly axis by the final assembly unit of the machine shown in Fig. 5.

Figure 4:
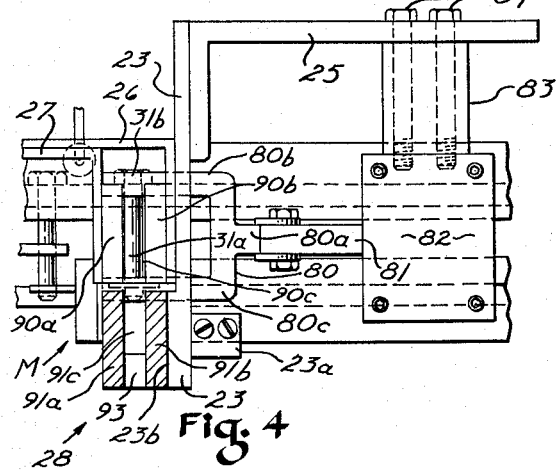
Fig. 4 is a sectional view taken tangentially to the assembling wheels and looking toward the wheels at the gate and the discharge positions along the line 4—4 of Fig. 3 with elements responsive switches removed.

In the final assembly unit, the elements are moved to the fully assembled position on the left in Fig. 5 in travelling from the receiving position M, corresponding to the discharge stations M of the first unit, to the delivery position D. This discharge chute 28 includes a pair of vertically aligned slides 90, 91. These slides have side walls 90a, 90b and 91a, 91b separated by vertically aligned slots 90c, 91c respectively. Both slots 90a and 90c are wider than the screw shank 31a but at least the upper end of the upper slot 90c is narrower than the screw head 31b, as shown in Fig. 4. The spacing between the side walls is maintained by having side walls 90a, 90b secured respectively to brackets 27 and 26 and by having side walls 91a, 91b spaced apart and secured to support member 23 by a spacer block 93 and a horizontally extending screw 94 extending through aligned holes in both side walls 91a, 91b and the spacer block 93 to be threaded into a hole in support member 23 through the raised boss 23b thereof. Both of these slides have their upper surfaces inclined downwardly toward the left with respect to the horizontal in Fig. 5 but with the upper slide having a steeper inclination with respect to the horizontal than the lower slide and having its delivery end at the left immediately above the lower slide. The right ends of the upper surfaces of these slides are aligned with the open mouths of the recesses 36a and 37a so as to permit gravity feed of the elements thereto. Hence, the initially and partially assembled screw and washer elements on the right in Fig. 5 will become fully assembled as they slide down the slides in a direction generally perpendicular to the assembly axis of the screw elements from the receiving to delivery positions, M and D, with the screw head 31b traveling along the upper slide.

Various changes in details and arrangement of parts can be made by one skilled in the art without departing from either the spirit of this invention or the scope of the appended claims.

What I claim is:

1. A machine for assembling screw elements and washer elements by relative movement along an assembly axis corresponding to the longitudinal axis of said screw element, comprising a screw element conveying wheel rotatable about an axis with a plurality of screw element carrier means equally spaced apart and located at a uniform distance from said axis, a washer element conveying wheel rotatable in generally axial alignment with said screw element conveying wheel about an axis with a plurality of washer element carrier means equally spaced apart the same distance as said screw element carrier means and located at a uniform distance from said axis, means synchronously driving both said element conveying wheels, and means operatively connecting the axes of said wheels non-coaxial and non-parallel with respect to each other so that said element carrier means on said wheels have approach movement as they rotate to cause telescopic assembly of said elements.

2. A machine for assembling screw elements and washer elements by relative movement along an assembly axis corresponding to the longitudinal axis of said screw element, comprising a screw element conveying wheel rotatable about an axis with a plurality of screw element carrier means spaced equal distances apart and located at a uniform distance from said axis, a washer element conveying wheel rotatable about an axis with a plurality of washer element carrier means spaced equal distances apart and located at a uniform distance from said axis with corresponding distances on both wheels being equal, means synchronously driving both said element conveying wheels, and means operatively connecting the axes of said wheels tilted and intersecting with respect to each other so that said element carrier means on said wheels have approach movement as they rotate, whereby telescopic assembly of said elements carried by said carrier means occurs.

3. A machine for assembling screw elements and washer elements by relative movement along an assembly axis corresponding to the longitudinal axis of said screw element, comprising a screw element conveying wheel rotatable about an axis with a plurality of screw element carrier recesses equally spaced about its periphery located at a uniform distance from said axis with each having an outwardly opening mouth, a washer element conveying wheel rotatable about an axis with a plurality of washer element carrier recesses equally spaced apart the same distance as said screw element carrier recesses about its periphery located at a uniform distance from said axis with each having an outwardly opening mouth, the element carrier recesses of each of said element conveying wheels being movable along a path of travel between loading and discharge stations, means for feeding elements into the element carrier recesses through said open mouths at the loading stations thereof, means synchronously driving both said element conveying wheels, means operatively connecting the axes of said wheels tilted and intersecting with respect to each other so that said element carrier recesses on said wheels have approach movement as they travel along the path between loading and discharge positions to cause telescopic assembly of said elements carried by said carrier means, and means at said discharge stations for discharging simultaneously a pair of assembled elements from both of said wheels.

4. A machine for assembling screw elements and washer elements by relative movement along an assembly axis corresponding to the longitudinal axis of said screw element, comprising a screw element conveying wheel rotatable about an axis with a plurality of screw element carrier recesses spaced equal distances apart about its periphery and located at a uniform distance from said axis with each having an outwardly opening mouth, a washer element conveying wheel rotatable about an axis with a plurality of washer element carrier recesses spaced equal distances apart about its periphery and located at a uniform distance from said axis with each having an outwardly opening mouth, corresponding distances on both wheels being equal, the element carrier recesses of each of said element conveying wheels being movable along a path of travel between loading and discharge stations, means synchronously driving both said element conveying wheels, means operatively connecting the axes of said wheels tilted and intersecting with respect to each other so that said element carrier recesses on said wheels have approach movement as they travel along the path between loading and discharge positions to cause initial telescopic assembly of said elements, both said wheel axes being tilted relative to the horizontal and being located on the same side of the vertical, and element retaining means covering the open mouths in the path of travel between loading and discharge stations, said loading and discharge stations being located respectively above and below the horizontal diameter of the associated wheels to provide gravity loading thereof and discharge therefrom through said mouths.

5. A machine for transferring and grouping elements, comprising a first element conveying means with a plurality of element carrier recesses equally spaced therealong with each having an open mouth, a second element conveying means with a plurality of element carrier recesses equally spaced therealong with each having an open mouth, the element carrier recesses of each of said element conveying means being movable along a path of travel between loading and discharge stations, means for feeding elements into the element carrier recesses through said open mouths at the loading stations thereof, means driving both said element conveying means so that said recesses align consecutively at said discharge position to cause grouping of said elements, each recess at said discharge stations opening generally downwardly to provide gravity discharge of grouped elements from the open mouths, gate means movable between recess mouths covering and uncovering positions at both discharge stations, and gate actuating means responsive to the simultaneous presence at said discharge stations of elements in recesses of both said conveying means and effective to move said gate between said positions whereby said gate is in the uncovering position with both elements present at the discharge stations and in the covering position if less than both are present so that only properly gathered element pairs are discharged therefrom.

6. A machine, as set forth in claim 5, wherein each conveying means is a wheel mounted for rotation about an axis, said carrier recesses are outwardly opening recesses in the periphery of said wheels, and said wheels have their axes tilted with respect to the horizontal with said discharge stations at the lower ends thereof.

7. A machine for assembling screw elements and washer elements by relative movement along an assembly axis corresponding to the longitudinal axis of said screw element, comprising an upper screw element conveying wheel rotatable about an axis with a plurality of screw element carrier recesses spaced equal distances apart about its periphery and located at a uniform distance from said axis with each having an outwardly opening mouth, a lower washer element conveying wheel rotatable about an axis with a plurality of washer element carrier recesses spaced equal distances apart about its periphery and located at a uniform distance from said axis with each having an outwardly opening mouth, corresponding distances on both wheels being equal, the element carrier recesses of each of said element conveying wheels being movable along a path of travel between loading and discharge stations, means synchronously and continuously driving both said element conveying wheels with said recesses traveling generally normal to said assembly axis from prior to until after initial assembly thereof with substantial relative movement and all rectilinear movement between said elements from prior to until after assembly thereof being confined to relative gradual and constant velocity axial approach movement between them, means operatively connecting the axes of said wheels tilted and intersecting with respect to each other so that said carrier recesses on said wheels have approach movement as they rotate along the path between loading and discharge positions to cause telescopic assembly of said elements, both said wheel axes being tilted relative to the horizontal and being located on the same side of the vertical, a retaining wall located about the periphery of each wheel and covering the open mouths in the path of travel between loading and discharge stations and from the discharge stations to above the horizontal on the return path, loading and discharge stations being located respectively above and below the horizontal diameter of the associated wheels to provide gravity loading thereof and discharge therefrom, the recess mouths in both said element conveying wheels being vertically aligned and facing outwardly in the same direction and inclined downwardly at the discharge stations, gate means movable between recess mouths covering and uncovering positions at both discharge stations, and solenoid type gate actuating means responsive to the simultaneous presence at said discharge stations of elements in the recesses of both said conveying wheels and effective to move said gate between said positions whereby said gate is in the uncovering position with both elements present at the discharge stations and in the covering position if less than both are present so that only assembled element pairs are discharged therefrom, any recess retained elements not ejected being returned past the loading stations to the discharge stations on the next cycle.

8. A machine for assembling in pairs screw elements and washer elements by relative movement along an assembly axis corresponding to the longitudinal axis of said screw element wherein said washer elements are detached from each other, means for individually feeding detached elements from a supply and for partially assembling in a pair a screw element and washer element with each pair detached from and capable of movement relative to each other pair, means for completing assembly of a pair of said partially assembled elements solely by the force of gravity controlling the assembly feed with the assembly feed rate of one element controlled by the other element with relative approach and separation movement permitted between pairs; said last mentioned means comprising a vertically aligned pair of vertically slotted slides with both inclined downwardly with respect to the horizontal from receiving to delivery positions so that gravity will carry them freely from receiving to delivery positions, the slot in both slides being wider than the screw shank, the slot in the upper slide being narrower than the screw head and the slot in the lower slide being narrower than the washer, the upper slide having a steeper inclination than the lower slide and having its delivery end immediately above said lower slide with at least the thickness of a washer therebetween, the receiving end of said slides being spaced close enough together to receive said partially assembled elements whereby initially and partially assembled screw and washer elements fed into said slide at said receiving position will become fully assembled as they freely slide down said slides in a direction generally perpendicular to the assembly axis from receiving to delivery positions wtih the screw head traveling along said upper slide.

9. A machine for assembling screw elements and washer elements by relative movement along an assembly axis corresponding to the longitudinal axis of said screw element, comprising an initial assembly unit for moving said elements to an initial telescopically associated location along said assembly axis and a final assembly unit for completing movement along said assembly axis; said initial assembly unit comprising an upper screw element conveying wheel rotatable about an axis with a plurality of screw element carrier recesses spaced equal distances apart about its periphery adapted to support downwardly extending screw shanks and located at a uniform distance from said axis with each having an outwardly opening mouth, a lower washer element conveying wheel rotatable about an axis with a plurality of washer element carrier recesses spaced equal distances apart about its periphery and located at a uniform distance from said axis with each having an outwardly opening mouth, corresponding distances on both wheels being equal, the element carrier recesses of each of said element conveying wheels being movable along a path of travel between loading and discharge stations, means synchronously and continuously driving both said element conveying wheels with said recesses traveling generally normal to said assembly axis from prior to until after initial assembly thereof wiht substantial relative movement and all rectilinear movement between said elements from prior to until after initial assembly thereof being confined to relative gradual constant velocity axial approach movement between them, means operatively connecting the axes of said wheels tilted and intersecting with respect to each other so that said carrier recesses have approach movement as they rotate along the path between loading and discharge positions to cause initial telescopic assembly of said elements, both said wheel axes being tilted relative to the horizontal and being located on the same side of the vertical, a retaining wall located about the periphery of each wheel and covering the open mouths in the path of travel between loading and discharge stations and from the discharge stations to above the horizontal on the return path, loading and discharge stations being located respectively above and below the horizontal diameter of the associated wheels to provide gravity loading thereof and discharge therefrom, the recess mouths in both said element conveying wheels being aligned vertically and facing outwardly in the same direction and inclined downwardly at the discharge stations, gate means movable between recess mouths covering and uncovering positions at both discharge stations, and solenoid type gate actuating means responsive to the simultaneous presence at said discharge stations of elements in the recesses of both said conveying wheels and effective to move said gate between said positions whereby said gate is in the uncovering position with both elements present at the discharge stations and in the covering position if less than both are present so that only initially assembled element pairs are discharged therefrom, any recess retained elements not ejected being returned past the loading stations to the discharge stations on the next cycle; said final assembly unit comprising a vertically aligned pair of vertically slotted slides with both inclined downwardly with respect to the horizontal from receiving to delivery positions, said slides being aligned respectively at said receiving positions one with each open mouth of an element carrier recess at a discharge station for gravity feed thereof, the slot in both slides being wider than the screw shank and the slot in the upper slide being narrower than the screw head, the upper slide having a steeper inclination than the lower slide and having its delivery end immediately above said lower slide, whereby initially assembled screw and washer elements will become fully assembled as they slide down said slides in a direction generally perpendicular to the assembly axis from receiving to delivery positions with the screw head traveling along said upper slide.

10. A machine for assembling screw elements and washer elements by relative movement along an assembly axis corresponding to the longitudinal axis of said screw element, comprising a screw element conveying wheel rotatable about an axis with a plurality of screw element carrier means spaced equal distances apart and located at a uniform distance from said axis, a washer element conveying wheel rotatable about an axis with a plurality of washer element carrier means spaced equal distances apart and located at a uniform distance from said axis with corresponding distances on both wheels being equal, means synchronously driving both said element conveying wheels, and means operatively connecting the axes of said wheels tilted and intersecting with respect to each other so that said element carrier means on said wheels have approach movement as they rotate, whereby telescopic assembly of said elements carried by said carrier means occurs, each element carrier means including means for retaining each element in its associated carrier means against axial movement and against substantial pivotal movement relative to its carrier about an axis extending transverse to the longitudinal axis of said element.

11. A machine for assembling screw elements and washer elements by relative movement along an assembly axis corresponding to the longitudinal axis of said screw element, comprising a screw element conveying wheel rotatable about an axis with a plurality of screw element carrier means spaced equal distances apart and located at a uniform distance from said axis, a washer element conveying wheel rotatable about an axis with a plurality of washer element carrier means spaced equal distances apart and located at a uniform distance from said axis with corresponding distances on both wheels being equal, means synchronously driving both said element conveying wheels, and means operatively connecting the axes of said wheels tilted and intersecting with respect to each other so that said element carrier means on said wheels have approach movement as they rotate, whereby telescopic assembly of said elements carried by said carrier means occurs, each element carrier means including means for retaining each element in its associated carrier means by gravity with the shanks of the screws directed downwardly from the screw heads toward the washers so that the telescopic assembly will be caused by gravity feed of the screw shanks into the washers.

12. A machine for assembling screw elements and washer elements by relative movement along an assembly axis corresponding to the longitudinal axis of said screw element, comprising a screw element conveying wheel rotatable about an axis with a plurality of screw element carrier means equally spaced apart and located at a uniform distance from said axis, a washer element conveying wheel rotatable about an axis with a plurality of washer element carrier means equally spaced apart the same distance as said screw element carrier means and located at a uniform distance from said axis, said assembly axis being approximately parallel to the axis of rotation of at least one of said wheels, means synchronously driving both said element conveying wheels, and means operatively connecting the axes of said wheels non-coaxial with respect to each other so that said element carrier means on said wheels have approach movement as they rotate to cause telescopic assembly of said elements.

13. A machine for assembling screw elements and washer elements by relative movement along an assembly axis corresponding to the longitudinal axis of said screw element, comprising a screw element conveying wheel rotatable about a screw element wheel rotation axis with a plurality of screw element carrier means equally spaced apart and located at a uniform distance from said screw element wheel rotation axis, a washer element conveying wheel rotatable about a washer element wheel rotation axis with a plurality of washer element carrier means equally spaced apart the same distance as said screw element carrier means and located at a uniform distance from said washer element wheel rotation axis, both of said rotation axes approximately coinciding, means synchronously driving both said element conveying wheels, and means operatively connecting the axes of said wheels non-coaxial with respect to each other so that said element carrier means on said wheels have approach movement as they rotate to cause telescopic assembly of said elements.

14. A machine for assembling screw elements and washer elements by relative movement along an assembly axis corresponding to the longitudinal axis of said screw element, comprising a screw element conveying wheel rotatable about an axis with a plurality of screw element carrier means equally spaced apart and located at a uniform distance from said axis, a washer element conveying wheel rotatable in overlapping alignment with said screw element conveying wheel about an axis with a plurality of washer element carrier means equally spaced apart the same distance as said screw element carrier means and located at a uniform distance from said axis, means synchronously driving both said element conveying wheels, and means operatively connecting the axes of said wheels non-coxial with respect to each other so that said element carrier means on said wheels have approach movement as they rotate to cause telescopic assembly of said elements.

15. A machine for assembling screw elements with each having a shank with longer axial length than diameter and washer elements having bores over these shanks by relative movement between first and second positions along an assembly axis corresponding to the longitudinal axis of said screw element, comprising a screw element carrier means comprising recesses having surfaces located below at least a portion of said screw elements and movable with said elements for supporting said screw elements; a washer element carrier means comprising recesses for supporting said washer elements; and means for assembling said elements while on said carrier means during travel between said positions; said assembling means including means synchronously driving both said element carrier means generally normal to said assembly axis between said positions from prior to until after assembly thereby, including means on said carrier means including said surfaces for preventing axial relative movement between each recess and its supported element during travel between said positions, and including means for moving the element carrying recesses of said carrier means toward each other along this assembly axis and along at least a portion of the length of said shank during travel between said positions from prior to until after element assembly thereby so that said elements are at least partially assembled.

16. A machine, as set forth in claim 15, with said recesses of said washer element carrier means having surfaces located below said washer elements, separate from said elements and movable therewith for supporting said washer elements.

17. A machine, as set forth in claim 15, with each screw element having a head secured to its shank with the underside of said heads supported by said carrier means surfaces so that said shanks are pulled downwardly by gravity and said heads are pulled against said surfaces by gravity as the shanks extend downwardly from these surfaces.

18. A machine for assembling screw elements and discrete washer elements by relative movement along an assembly axis corresponding to the longitudinal axis of said screw element with each screw element having a head and a shank, comprising a screw element carrier means having a recess with a surface located below and movable with said screw element head with said shank suspended below said head and extending through said recess; a washer element carrier means independent of said washer elements; feeding means for loading said discrete washer elements onto said washer element carrier means at a loading position from a supply of discrete washer elements spaced from and separate from said washer element carrier means; means operatively connecting said element carrier means for movement along approximately parallel but converging paths of travel between loading and discharge stations; and means for assembling said discrete elements while on said carrier means during the travel between loading and discharge stations; said assembling means including driving means continuously driving both said element carrier means along the path past said loading position during washer element loading from said supply and between loading and discharge positions, and including means for moving one carrier means toward the other during driving of said element carrier means along the path between loading and discharge positions so that the elements are assembled.

19. A machine for assembling discrete screw elements and washer elements by relative movement from a loading position to a discharge position along an assembly axis corresponding to the longitudinal axis of said screw element, comprising a screw element conveying means with a plurality of socket type screw element carrier means having sockets equally spaced therealong for supporting a screw element in each socket, a washer element conveying means with a plurality of socket type washer element carrier means having sockets equally spaced therealong for supporting a washer element in each socket, means synchronously driving both said element conveying means generally normal to said assembly axis from prior to until after assembly thereof, each of said socket type element carrier means having an open mouth extending laterally and to at least one side of the paths of element travel at at least one of said positions for movement of elements through said open mouths, and means operatively connecting both said element conveying means for moving said sockets of said socket type carrier means toward each other as they travel so that said elements move from axially spaced apart position into telescopically assembled relationship.

20. A machine for transferring and assembling discrete elements in an assembly operation from a loading station to a discharge station, comprising a first element conveying wheel rotatable about an axis with a plurality of element carrier recesses equally spaced about its periphery located at a uniform distance from said axis with each having an outwardly opening mouth extending radially outwardly, a second element conveying wheel rotatable about an axis with a plurality of element carrier recesses equally spaced apart the same distance as those in said first wheel about its periphery located at a uniform distance from said axis with each having an outwardly opening mouth extending radially outwardly, means for maintaining said element carrier recesses and said first and second elements in separated spaced apart relation at said loading station, means responsive to movement of said wheels and recesses along a path of travel between loading and discharge stations for moving said recesses and elements toward each other, means for feeding discrete elements into the element carrier recesses through said open mouths at the loading stations thereof, element retainer means covering at least one of said open mouths through at least a portion of said assembly operation toward said discharge station, and means synchronously driving both said element conveying wheels for moving said carrier recesses toward each other so that said elements are assembled as they travel between loading and discharge stations.

21. A machine for assembling complementary elements, comprising a frame, a first feeding means on said frame for feeding a first element from a supply thereof to a discharge station, a second feeding means on said frame for feeding a second element from a supply thereof to said discharge station, assembling means on said frame for assembling the elements together during transport by said feeding means to said discharge station, means on said frame for preventing discharge of either element from its feeding means when unassembled between said supply and discharge stations therefor, means on said frame for preventing discharge of either element from its feeding means when ungrouped at said discharge station, and element discharge means on said frame at said discharge station responsive to the simultaneous presence of both elements in assembled relationship for discharging assembled elements so that only assembled element pairs are discharged therefrom.

22. A machine for transferring and grouping elements, comprising a frame, a first feeding means on said frame for feeding a first element from a supply thereof to a discharge station, a second feeding means on said frame for feeding a second element from a supply thereof to said discharge station, assembling means on said frame for grouping the elements together during transport by said feeding means on said first and second elements from said supplies to the discharge station, means on said frame for preventing discharge of either element from its feeding means when ungrouped between said supply and discharge stations therefor, means on said frame for preventing discharge of either element from its feeding means when ungrouped at said discharge station, and element discharge means on said frame at said discharge station responsive to the simultaneous presence of both elements for discharging group elements so that only properly grouped elements are discharged therefrom.

23. A machine for assembling discrete screw elements and washer elements by relative movement along an assembly axis corresponding to the longitudinal axis of said screw element, comprising a screw element carrier means; a washer element carrier means, said washer element carrier means including means for supporting in a first position prior to assembly said discrete washer elements in the washer element carrier means independently of and spaced out of contact with said discrete screw elements in the screw element carrier means; each carrier means having an open mouth for loading and unloading its discrete elements; and means for moving said carrier means from said first position in approach movement toward each other during element assembly so that said elements carried by said carrier means are assembled; said assembling means including alignment means for keeping both said element carrier means and the mouths thereof aligned with each other parallel to said assembly axis, and including driving means for driving both said element carrier means generally normal to said assembly axis while said alignment is maintained from prior to until after element assembly thereby.

24. A machine for assembling discrete screw elements and discrete washer elements by relative movement along an assembly axis corresponding to the longitudinal axis of said screw element with each screw element having a head and a shank, comprising a screw element carrier means having a recess with a surface located below and movable with said screw element head with said shank suspended below said head and extending through said recess; a washer element carrier means; and means for assembling said elements while on said carrier means; said assembling means including means synchronously and independently driving both said element carrier means, including means for moving said carrier means in a converging path toward each other during said synchronous driving from prior to until after element assembly thereby, and including means on each carrier means for maintaining the axes of the discrete elements thereon substantially in parallel positions throughout their travel so that said discrete elements will be assembled by solely the converging movement of said carrier means.

25. A machine for assembling discrete screw elements and discrete washer elements by relative movement along an assembly axis corresponding to the longitudinal axis of said screw element with each screw element having a head and a shank, comprising a screw element carrier means having a recess with a surface located below and movable with said screw element head with said shank suspended below said head and extending through said recess; a washer element carrier means; chute type loading means for loading said discrete elements in equally spaced relationship onto said carrier means from an element supply spaced from and separate from said carrier means; and means for assembling said discrete elements while on said carrier means; said assembling means including means synchronously driving both said element carrier means, including means for moving said carrier means in approach direction toward each other during said synchronous driving from prior to until after element assembly thereby, and including retaining means located between said discrete elements during assembly for retaining said discrete elements in spaced apart and discrete relationship on their respective carrier means.

26. A machine for assembling discrete screw elements and washer elements by relative movement along an assembly axis corresponding to the longitudinal axis of said screw element with each screw element having a head and shank, comprising a screw element carrier means having a recess with a surface located below said screw element head with said shank freely suspended below said head through said recess so that gravity will properly orient said shank with respect to a washer element for assembly; a washer element carrier means movable independently of and relative to said screw element carrier means; and means responsive to solely the movement of said carrier means for assembling said elements while on said carrier means; said assembling means including means synchronously driving both said element carrier means, including means for moving said carrier means in approach direction toward each other during said synchronous driving from prior to until after element assembly thereby so that each said washer element and shank are relatively moved coaxially along said assembly axis from time immediately prior to transverse alignment of any portions of said elements relative to said assembly axis until the time of final assembly.

27. A machine for assembling screw elements and washer elements by relative movement along an assembly axis corresponding to the longitudinal axis of said screw element, comprising a screw element carrier means; a washer element carrier means; and means for assembling said elements while on said carrier means; said assembling means including means synchronously driving each of said element carrier means along a separate curved path of movement, including means for moving said carrier means in approach direction toward each other from prior to until after element assembly thereby, and including means for maintaining said assembly axis non-radially to said curved path and acute angularly inclined to at least one of said paths.

28. A machine, as set forth in claim 19, with means for maintaining the alignment of said open mouths along said assembly axis in said discharge position for discharging elements in assembled pairs.

29. A machine for assembling discrete screw elements and discrete washer elements by relative movement along an assembly axis corresponding to the longitudinal axis of said screw element with each screw element having a head and a shank, comprising a screw element carrier means having a recess with a surface located below and movable with said screw element head with said shank suspended below said head and extending through said recess; a washer element carrier means having surfaces for supporting and driving said discrete washer elements along a path; said recess and surface on said screw element carrier means supporting and driving each screw element along a path with each shank freely suspended below its head and pulled downwardly by gravity and its head pulled against said surface by gravity as its shank extends downwardly through said recess to be properly oriented with a washer element; means for loading said discrete washer elements individually onto the surface of said washer element carrier means prior to assembly; and means for assembling said elements while on said carrier means; said assembling means including means driving both said element carrier means along said path generally normal to said assembly axis from prior to until after assembly thereby, and including means for moving said surfaces of said carrier means toward each other along this assembly axis from prior to until after assembly of said elements so that all substantial relative movement between said elements is confined to relative axial approach movement between them along this assembly axis.

References Cited in the file of this patent

UNITED STATES PATENTS

| | | |
|---|---|---|
| 663,122 | Hakewessell | Dec. 4, 1900 |
| 1,861,889 | Stoll | June 7, 1932 |
| 2,183,600 | Werner | Dec. 19, 1939 |
| 2,271,154 | Niskanen | Jan. 27, 1942 |
| 2,284,690 | Stern | June 2, 1942 |
| 2,577,020 | Large | Dec. 4, 1951 |
| 2,642,592 | Nielsen | June 23, 1953 |
| 2,642,593 | Poupitch | June 23, 1953 |
| 2,752,618 | Stern | July 3, 1956 |
| 2,792,578 | Autio | May 21, 1957 |